E. H. JOSSELYN.
EYEGLASSES.
No. 61,073.  Patented Jan. 8, 1867.
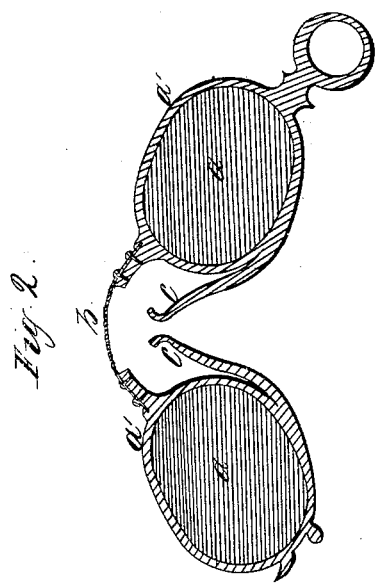
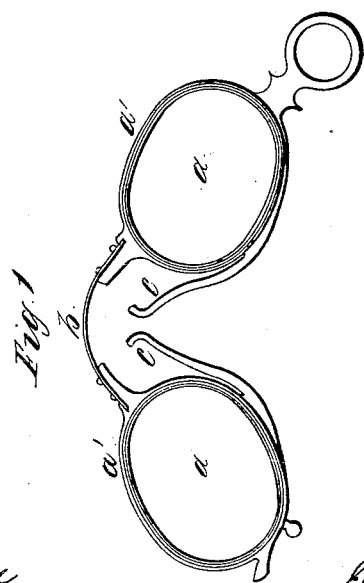

United States Patent Office.

ELLIS K. JOSSELYN, OF CAMBRIDGE, MASSACHUSETTS.

Letters Patent No. 61,073, dated January 8, 1867.

IMPROVEMENT IN EYE-GLASSES.

The Schedule referred to in these Letters Patent and making part of the same.

TO WHOM IT MAY CONCERN:

Be it known that I, ELLIS K. JOSSELYN, of Cambridge, in the county of Middlesex, and State of Massachusetts, have invented a new Improvement in Eye-Glasses and Spectacles; and I hereby declare that the following is a full and exact description of the same, reference being had to the accompanying drawings and to the letters of reference marked thereon, making a part of this specification, of which—

Figure 1 is a front view of the invention.

Figure 2 is a section of ditto.

The letters $a\ a$ represent the glasses; $a'\ a'$ the frames; $b$ the spring; $c\ c$ the extensions of the frame $a'$.

The nature of my invention consists in providing the frames of eye-glasses and spectacle-glasses with extensions on that side of the glasses next to the spring, and fitting on to the nose of the wearer, so that the glasses will be less likely to slip off.

To enable others to make and use my invention, I will proceed to explain its construction and use.

In the use of eye-glasses, they are very apt to fall off by any sudden jar, or when the nose is moist with perspiration. To remedy this tendency to fall off, I have provided the frames of glasses with prongs or extensions, made so as to fit easily on to the nose. These prongs or extensions may be a part of the frames, or may be riveted or fastened on to the frames. (See figs. 1 and 2 in drawings.) I make my frames of glasses in the usual way and of the usual material. These prongs or extensions are flexible, fitting on to the nose and holding on firmly, and giving less painful sensation than the simple spring, because the strain is more distributed, and the advantage gained is, the glasses will be less likely to fall off, which is the greatest objection to wearing eye-glasses.

Figures 1 and 2 in the drawings exhibit an eye-glass, in which the prongs $c\ c$ are extensions of the frames $a'\ a'$, and made of the same material; but the prongs may be made of metal, or of any suitable material, and fastened on to the frames.

What I claim as my invention, and desire to secure by Letters Patent, is—

The extensions $c\ c$, either as part of the frames $a'\ a'$, or fastened to the same by any suitable fastening, substantially as described and for the purpose set forth.

ELLIS K. JOSSELYN.

Witnesses:
J. L. NEWTON,
E. R. DRAKE.